United States Patent [19]
Lortz et al.

[11] Patent Number: 5,722,709
[45] Date of Patent: Mar. 3, 1998

[54] SEPARATION DEVICE USING A SHAPE MEMORY ALLOY RETAINER

[75] Inventors: Bradley K. Lortz, Rosemead; Allan Tang, Torrance, both of Calif.

[73] Assignee: Hughes Electronics, Los Angeles, Calif.

[21] Appl. No.: 738,451

[22] Filed: Oct. 30, 1996

[51] Int. Cl.[6] .................................................. F03G 7/06
[52] U.S. Cl. ........................ 294/86.4; 294/82.24; 60/527; 403/28
[58] Field of Search ........................ 294/1.1, 82.24, 294/82.26, 82.35, 86.4, 902, 906; 60/527, 528; 244/161, 173; 901/30, 31, 36; 148/402; 403/28

[56] References Cited

U.S. PATENT DOCUMENTS

| | | | |
|---|---|---|---|
| 3,454,286 | 7/1969 | Anderson et al. | 294/82.24 |
| 4,715,637 | 12/1987 | Hosoda et al. | 294/86.4 |
| 4,899,543 | 2/1990 | Rommanelli et al. | 294/86.4 |
| 5,060,888 | 10/1991 | Vezain et al. | 403/28 |
| 5,312,152 | 5/1994 | Woebkenberg, Jr. et al. | 294/86.4 |
| 5,471,888 | 12/1995 | McCormick | 403/28 |
| 5,586,983 | 12/1996 | Sanders et al. | 403/28 |

OTHER PUBLICATIONS

NSR2001-3 (No–Shock, Resettable, ⅛" Dia), *Hi–Shear Technology Corp.*, Torrance California, no date.

*Primary Examiner*—Dean Kramer
*Attorney, Agent, or Firm*—P. Y. Price; T. Gudmestad; W. K. Denson-Low

[57] ABSTRACT

A retainer made from a shape memory alloy (SMA) is utilized in a separation device that is particularly useful for space applications. Upon being heated to a restoration temperature, the retainer changes from a constricted state to an expanded state. In its constricted state, the retainer surrounds and captures a plurality of securing segments to secure an object. To release the secured object, the retainer is heated to its restoration temperature with an electrical heater, causing the retainer to return to its expanded state and allow the securing segments to move apart and release the secured object.

23 Claims, 4 Drawing Sheets

SEPARATION DEVICE USING A SHAPE MEMORY ALLOY RETAINER

BACKGROUND OF THE INVENTION

1. Field of the Invention

This invention relates to devices used to secure and release objects, particularly those that use a shape memory alloy material as part of their release mechanism.

2. Description of the Related Art

Solar panels, reflectors, instrumentation packages and many other objects are deployed in space each year. These objects are tightly secured to their spacecraft during transit, then released or deployed upon command. Historically, the releasing mechanism used to separate the device from its carrier was an explosive separation nut. Upon command from a computer or a human operator, an explosive charge mounted to a separation device would be set off to dislodge a retaining device or fracture a bolt, and thus release the object.

The use of an explosive charge to separate an object from its mooring results in considerable shock being imparted to the object and the spacecraft, from the explosive itself as well as from the stored strain energy released as the mated parts separate. Debris and outgassing contaminants are also byproducts of this method of deployment, endangering the object being deployed as well as any nearby structures. Due to its explosive nature this type of device can only be used once, thus eliminating the possibility of field testing each device before use. Therefore, such a device must undergo extensive qualification testing, with each lot accepted on a purely statistical basis. Furthermore, the necessity of using high pressure housings and seals and explosive initiators adds weight, complexity and cost.

In recent years there has been considerable focus on the development of a non-explosive separation device that avoids the above problems. Ideally, such a device would be slow-releasing to minimize shock, non-contaminating, predictable, testable and lightweight. Most importantly, to meet the critical demands of a space mission the device must be completely reliable.

Some separation devices have been developed that utilize the properties of a material type known as a shape memory alloy (SMA). An item made from a SMA can be formed into an "original" shape, subjected to a high temperature treatment, then cooled and forced into a different shape; when heated to a moderate temperature it will return to its original shape. A separation device using a SMA is described in U.S. Pat. No. 5,312,152 to Woebkenberg, Jr. et al. This device uses a SMA in the form of a rod which shrinks when heated to dislodge a retaining ring, thus allowing some threaded segments to move apart (aided by a plunger and spring mechanism) and release the secured object. Another device, manufactured by Hi-Shear Technology Corp. (part no. NSR2001-3) uses a SMA cylinder in the load path. When an object is secured to its mooring, this cylinder supports much of the load, known as the "preload." When heated, the cylinder contracts to relax the preload, allowing some threaded segments to move apart and release the object, again aided by a spring.

Both of these designs, and other similar devices, depend on secondary actuators to release the threaded segments securing the object. The motion of a SMA component is used to move a second component which, aided by some sort of spring arrangement, allows the threaded segments securing the object to move apart and release the object. This involved sequence of movements can be affected by friction, amount of preload, temperature and other factors that add to the possible failure modes.

SUMMARY OF THE INVENTION

The present invention seeks to provide a simple, low-shock, non-contaminating, lightweight, testable device for releasing secured objects, that is more reliable and has fewer moving parts than previous designs.

These goals are accomplished by using a retainer that is made from a shape memory alloy (SMA) material. The retainer perimeter is designed to expand when heated. While in its constricted state, the retainer surrounds and captures a segmented securing device that secures an object. When heated to a restoration temperature, the retainer returns to its expanded state, allowing the securing device segments to move apart and release the object.

Thus, the invention eliminates the need for the additional actuation component found in other devices using SMA materials. The only moving parts are the retainer and the segments. Weight is reduced, failure modes related to actuator or spring movement are eliminated, and reliability is greatly enhanced.

The retainer is preferably formed into a ring shape that surrounds a plurality of threaded segments that form a segmented nut. When the retainer is in its constricted state, it holds the segments together to secure an object. The segments are preferably supported by a base that tapers away from the segments. When the retainer is heated to a restoration temperature, it returns to its expanded state. With the retainer expanded, the segments are free to move apart and release the object. The heat needed to restore the retainer to its expanded state is preferably provided by a remotely activated electrical heater mounted to the surface of the retainer. The tapered base aids the outward movement of the segments because the released segments can ride down the base surface at the taper angle. Even in a gravity-free environment, the segments will be urged down the base surface due to the high compressive forces typically present when objects to be deployed in space are secured.

Further features and advantages of the invention will be apparent to those skilled in the art from the following detailed description, taken together with the accompanying drawings.

DETAILED DESCRIPTION OF THE INVENTION

Figure 1:
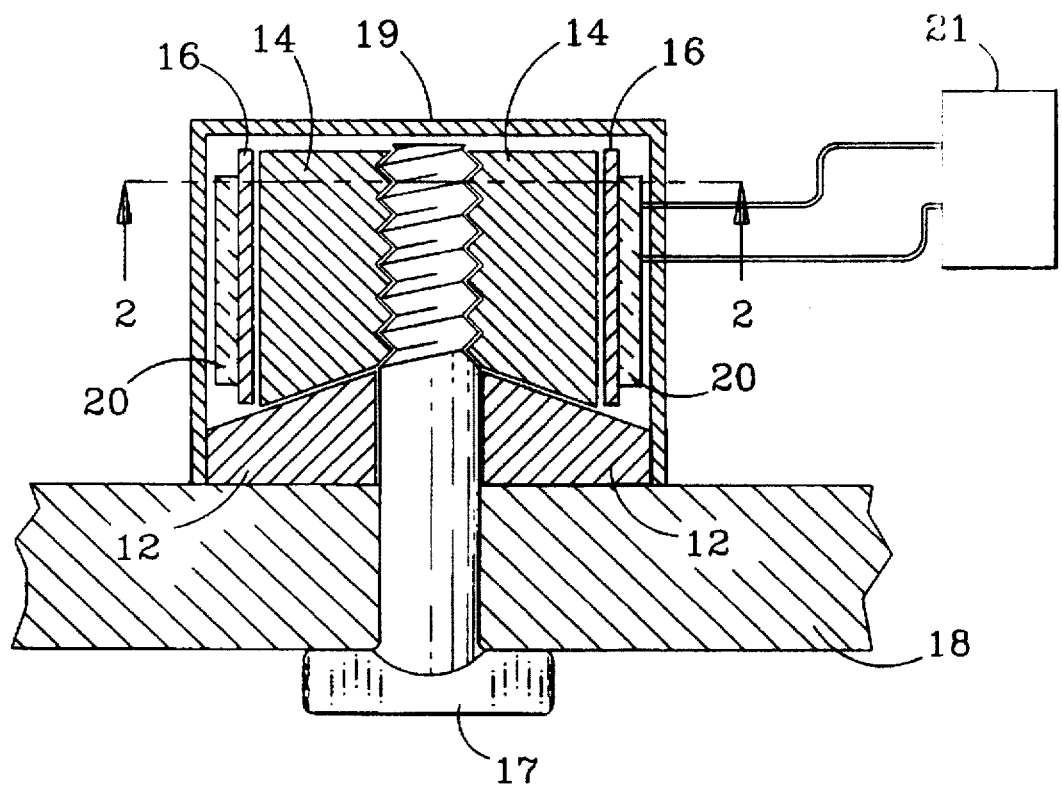
FIG. 1 is a sectional view of the preferred embodiment of the invention.
Figure 2:
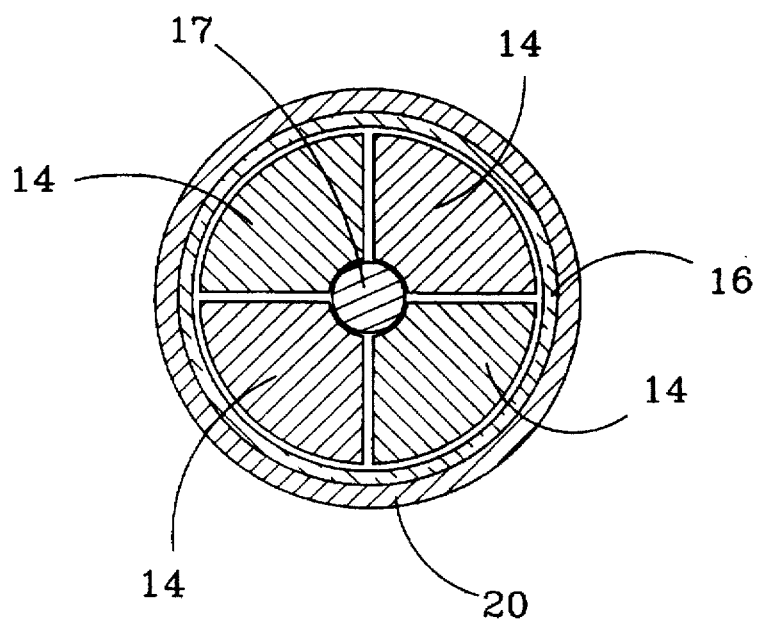
FIG. 2 is a top plan view of the embodiment shown in FIG. 1.

A separation device that provides a simple, reliable means of securing and releasing objects is shown in FIGS. 1 and 2.

The separation device includes a segmented securing device comprising two or more segments 14 that form a perimeter when placed together, surrounded by a retainer 16, preferably ring-shaped, that captures the segments and holds them in contact with a workpiece 17. Typically, the workpiece 17 will be a bolt that engages a circular threaded opening of a segmented nut formed by the captured segments 14. An object to be secured 18 (not shown in FIG. 2), such as a solar panel or instrumentation package, is held in place by the bolt. A housing 19 (not shown in FIG. 2) typically surrounds the separation device to prevent any pieces from flying outward.

The device's segments 14 may also be designed to engage a non-threaded workpiece 17, or may be used to secure an object directly, without the need for a workpiece. Further, the perimeter formed by the segments 14 is not limited to a circular shape, but can be elliptical, square, triangular or any other shape that can surround an object. The retainer 16 must be formed such that when placed around the segments 14, the retainer will hold the segments in contact with the workpiece 17, or the object to be secured 18. A non-circular perimeter may affect the release margin of the device, however, so a constant radius at the point of contact with the workpiece is preferred.

The retainer 16 is formed from a material known as a shape memory alloy (SMA). SMA materials are available from Raychem Corp. in Menlo Park, Calif. Shape memory alloys exhibit the property of "remembering" a preset shape, even after the material is severely deformed into a different shape. After being deformed, the SMA material can be returned to its preset shape by the application of heat. The temperature at which the restoration takes place is determined by the particular alloy composition. Restoration temperatures between −273° and +100° C. are possible. The preferred SMA is a nickel-titanium alloy called Tinel, which has a restoration temperature of 100 degrees C. Tinel is available from Raychem Corp.

Initially, the retainer 16 is formed into its preset shape, which in this specification is called the "expanded state." The retainer 16 is then subjected to the processing necessary (discussed below) for the SMA material to "remember" its preset state. The retainer 16 is then forcibly deformed into what is herein referred to as the "constricted state." In its constricted state, the retainer 16 has a smaller perimeter than when in its expanded state. The perimeter chosen for the constricted state must be such that, with the retainer 16 in place, the segments 14 are held in contact with the workpiece 17 and hold it in place. The perimeter chosen for the expanded state must be such that, with the retainer 16 in place, there is sufficient clearance between the workpiece 17 and the retainer for the segments 14 to move outward and release their hold on the workpiece. Thus, to release an object that is secured with a bolt threaded into the segments 14, with the segments held in place by the retainer 16 in its constricted state, one need only apply enough heat to the retainer so that it can reach its restoration temperature. The retainer 16 will return to its expanded state, allowing the segments 14 sufficient clearance to move outward and release the bolt.

In the preferred embodiment shown in FIGS. 1 and 2, retainer 16 is in the form of a hollow cylinder. There are at least two segments 14 that utilize conventional threads to engage a workpiece 17, which would typically be a bolt. The segments 14 are arc-shaped and form a segmented nut having a complete circular threaded opening when retained by the retainer 16 in its constricted state. That is, if three segments 14 are utilized, each has an arc of 120°. If four segments 14 are used, each has an arc of 90°. The retainer 16 has a constricted state with a diameter necessary to hold the segments 14 in contact with the workpiece 17, and an expanded state with a diameter necessary to allow the segments to move outward and release their hold of the workpiece. A base 12 supports the threaded segments 14 on a surface that tapers away from the segments, and has an opening through which a bolt would pass to engage the segments. An electrical heater 20 affixed to the surface of the retainer 16 provides the heat necessary to return the retainer to its expanded state.

A device as described above is assembled by first inserting the threaded segments into the retainer and aligning their threads, thus forming a segmented nut. The retainer and segmented nut are then held against the upper base surface as the bolt is threaded into the segmented nut.

A shape memory alloy "remembers" its preset form via the following mechanism: initially, the atoms of a SMA material are in a crystal structure known as "martensite." When heated to a high enough temperature (dependent on the exact alloy being used), a transformation in the crystal structure takes place. The crystal structure at this elevated temperature is referred to as "austenite." If a SMA material is bent into some configuration at room temperature and then heated, the austenite crystal structure is attained. When cooled, the alloy's atoms rearrange themselves into the crystal form of martensite. If the material is now deformed into another configuration and heated to a temperature above that at which martensite transforms to the austenite phase, an orderly shift of atoms restores the material to the original configuration.

The process used to preset a shape in a SMA element is outlined below.

Step 1. Obtain the SMA material in a basic shape, such as a wire, sheet, rod, tube, extrusion, casting, etc.

Step 2. Form the SMA material into an element with the desired "original" configuration.

Step 3. Clamp the element to prevent distortion or motion during heat treatment.

Step 4. Heat treat the clamped element to a temperature well above its restoration temperature (time and temperature are dependent on the particular SMA being used).

Step 5. Cool the element back to a temperature below the restoration temperature.

Step 6. Form the element into a different shape by plastically deforming it, for example, by extruding it to decrease its diameter.

Thereafter, when the deformed element is heated to a temperature above its restoration temperature, it will return to its "original" shape.

A typical application of the separation device would be on a satellite, with the device securing a object 18 such as a solar panel until the electrical heater 20 was remotely activated to release the panel. The solar panel is secured by having a bolt 17 passing through the solar panel, through the base 12, and engaging the threaded segments 14, with the segments held in contact with the bolt by the retainer 16 in its constricted state. In order to insure that they survive the launch, objects to be deployed on a spacecraft are often secured to the point where the object 18 is actually compressed by being squeezed between the bolt head and the base 12 of the separation device. This results in a force being imparted on the bolt 17 along its longitudinal axis, known as the "preload" force. Objects being transported into space are often secured with a defined amount of preload. The stresses imparted to the retainer 16 for a particular preload are determined by several device parameters (discussed below).

To release the solar panel, the electrical heater 20 is activated. When the retainer 16 reaches the restoration temperature, it will slowly expand to its expanded state. As the retainer 16 expands, the segments 14 will be free to move apart, urged outward by the preload force acting on the engaged threads. The segments 14 are further urged outward if the base 12 is tapered away from the segments, so that the segments can ride down the base surface and away from the bolt in response to the expansion of the retainer 16 and the preload force.

Figure 3:
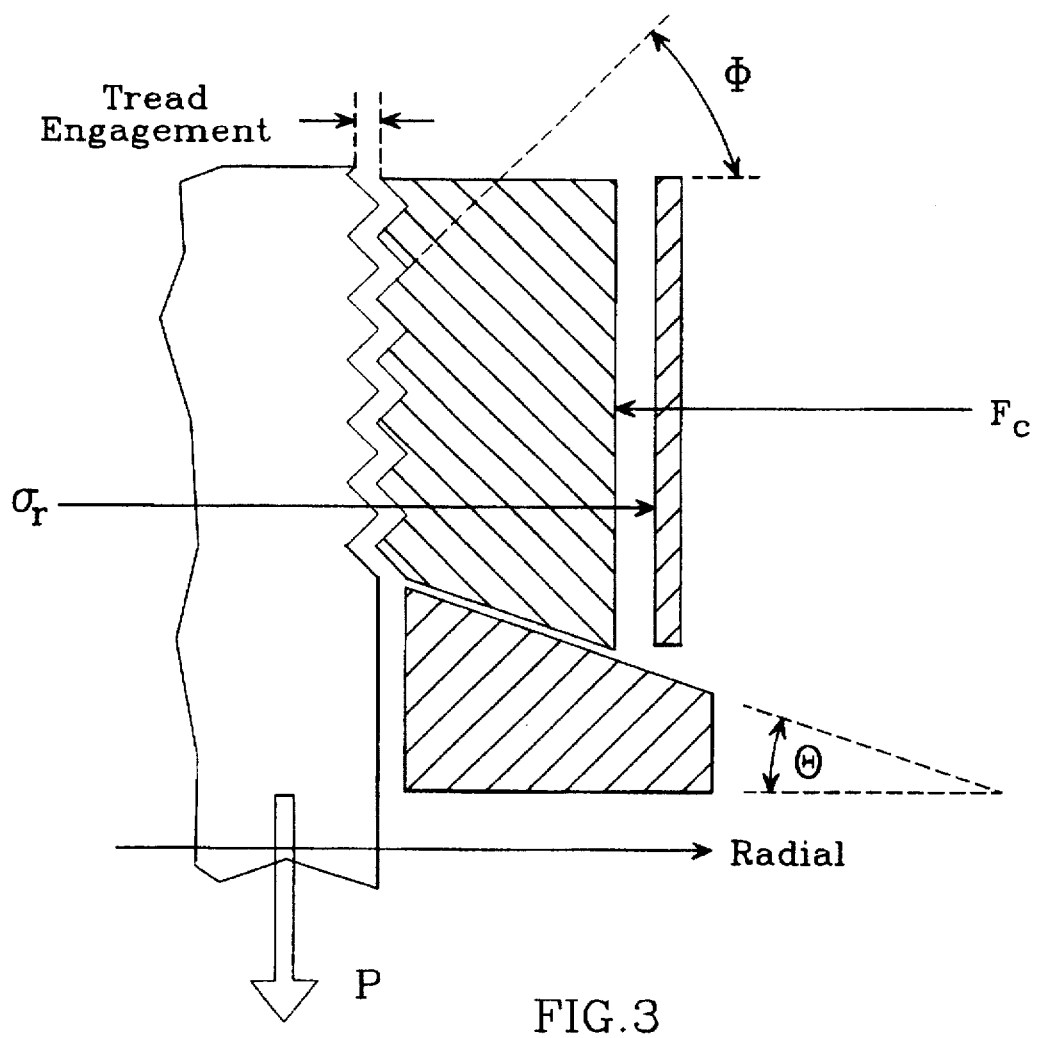
FIG. 3 is a diagram showing various angles and forces to be considered in implementing the invention.

In a separation device utilizing threaded segments, the segments 14 carry all of the preload, while the retainer 16 maintains a supporting radial load to capture the segments, "radial" being defined as the direction perpendicular to the longitudinal axis of the segmented nut. This supporting radial load and the resulting retainer stresses are primarily determined by the preload amount and the thread and base angles. The stresses on a retainer 16 for a given preload can be determined by the following formulae (refer to FIG. 3):

First, calculate the normal force $F_r$ (in dynes) imparted on one segment 14 by the retainer 16:

$$F_r = P/n[\tan\phi - \mu_1 + (\sin\theta - \mu_2\cos\theta)((1+\mu_1\tan\phi)/(\cos\theta+\mu_2\sin\theta))]$$

where P is the preload (dynes), n is the number of segments 14, $\phi$ is the thread angle (degrees) to radial for the threaded opening and bolt threads, $\mu_1$ is the thread coefficient of friction, $\theta$ is the taper angle (degrees) to radial of the base 12 surface, and $\mu_2$ is the base coefficient of friction.

The retainer 16 stresses $\sigma_r$ (in bars) can then be determined by the following equation:

$$\sigma_r = (nF_r)/(2\pi ht)$$

where h is the retainer height (centimeters) and t is the retainer wall thickness (centimeters). This equation yields reasonable results if the retainer 16 wall thickness is less than one tenth of the retainer diameter. It is important to insure that the SMA material chosen for the retainer 16 can withstand the stresses imparted to it for a given preload and a given device configuration. The thread and base angles should also be carefully considered: a base surface with a steep angle to radial will tend to urge the segments outward more than a shallow angle would, but would also cause a greater stress to be imparted on the retainer. A shallow base angle reduces the stress on the retainer, but provides less outward urging of the segments than does a steep angle. A thread angle of about 30 degrees and a base angle of about 20 degrees provides a good balance between retainer stress and the outward urging of the segments.

Though some SMA's have been shown to recover 100% of their original configuration after being subjected to a strain of 9%, a typical design guideline limits the strain to 4–5% to achieve 100% shape recovery. For example, a separation device using a retainer 16 made from a SMA material that has a design guideline of no more than 5% total strain must be designed so that a 5% change in retainer diameter will be sufficient to allow the retained segments 14 the necessary clearance to move outward and release the secured object. Assume a SMA retainer 16 with a constricted diameter of 1.5 inches that when heated expands 5%, or 0.075 inches. If threaded segments 14 are used to secure a bolt, the depth of thread engagement must be less than half the diameter change of the retainer 16, or in this example less than 0.0375 inches, for the device to properly release the bolt.

The electrical heater 20 would typically be an electrical resistance-type, and would preferably take the form of a band or strip affixed to and contacting a high percentage of the outer surface of the retainer 16. When activated with a flow of electrical current, a heater 20 of this type will provide heat equally around the perimeter of the retainer, facilitating a consistent expansion of the retainer. A plurality of independent, individually-powered heater "pads" affixed to the retainer 16 outer surface would suffice as well. The heater 20 must be able to accommodate the expansion of the retainer, as would a strip heater comprised of an elastic material, or the independent heater pads discussed above. The heater 20 would typically be activated from a remote location. The remote actuation device 21 would consist of a switchable electrical current source, capable of supplying a sufficient amount of electrical current to the affixed heater 20 so that the retainer 16 can reach its restoration temperature. Such a remote actuation device 21 could be made to be switched on by human, electrical or mechanical means.

The release time, i.e. the time between the application of electrical power to the heater 20 and the release of the workpiece 17, is a function of the power generated in the heater and the mass of the SMA retainer 16. Assume a SMA retainer 16 with a diameter of 1.5 inches, a height of 0.5 inches, a thickness of 0.1 inches, and requiring a temperature change of 100° C. to reach its restoration temperature. Using a 30 watt heater 20, after power has been applied and the heater has reached its operating temperature, such a retainer 16 will require approximately 1.5 minutes to reach its expanded state and release the workpiece 17. Note that a retainer 16 with a smaller heater 20 will have a correspondingly longer release time. Losses to the surrounding environment will adversely affect the release time as well.

Figure 4:
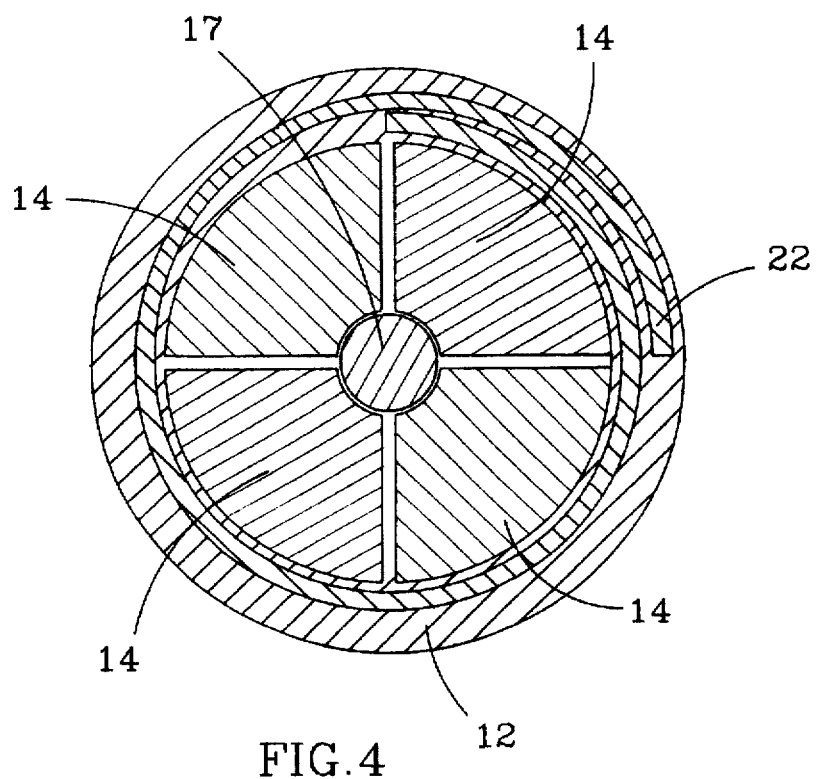
FIG. 4 is a top plan view of an alternate embodiment of the invention using a coiled band retainer.

Another embodiment of the separation device is shown in FIG. 4. This embodiment utilizes a retainer 22 formed into the shape of coiled band. This retainer 22, made from a SMA material, has constricted and expanded states. When in its constricted state, the retainer 22 surrounds and captures a plurality of segments 14 and holds them in contact with the workpiece 17. This type of retainer 22 is likely to have a greater separation margin and be easier to manufacture than the cylindrical retainer discussed above. Separation margin is the amount by which the retainer 22 perimeter increases beyond that necessary to release the segments 14. However, the load capability with a retainer 22 of this type may be less than that of a solid cylindrical retainer.

Figure 5:
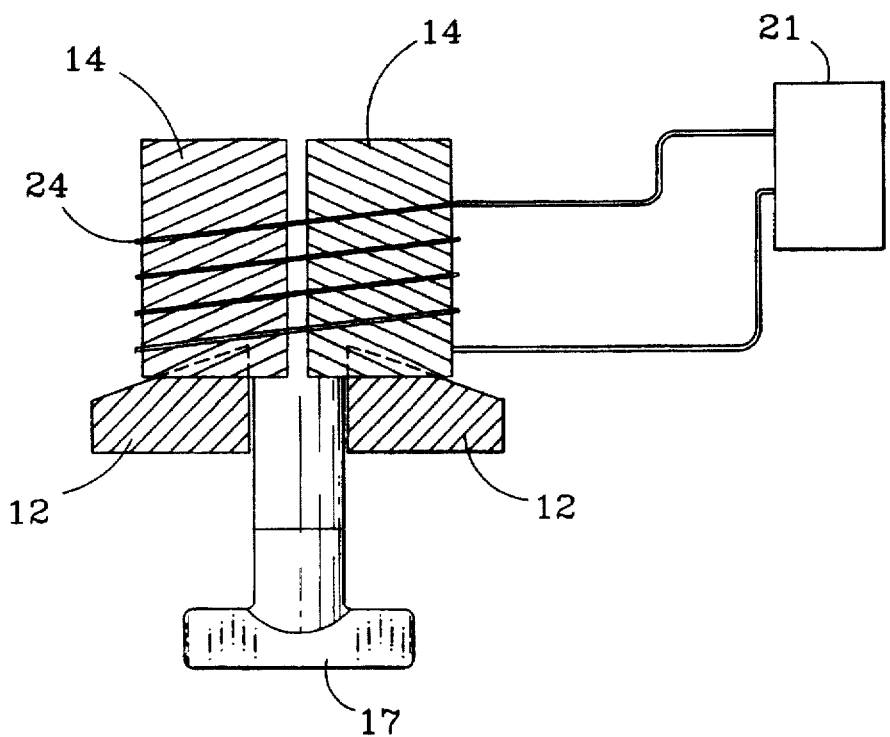
FIG. 5 is a sectional view of an alternate embodiment of the invention using a helical wire retainer.
Figure 6:
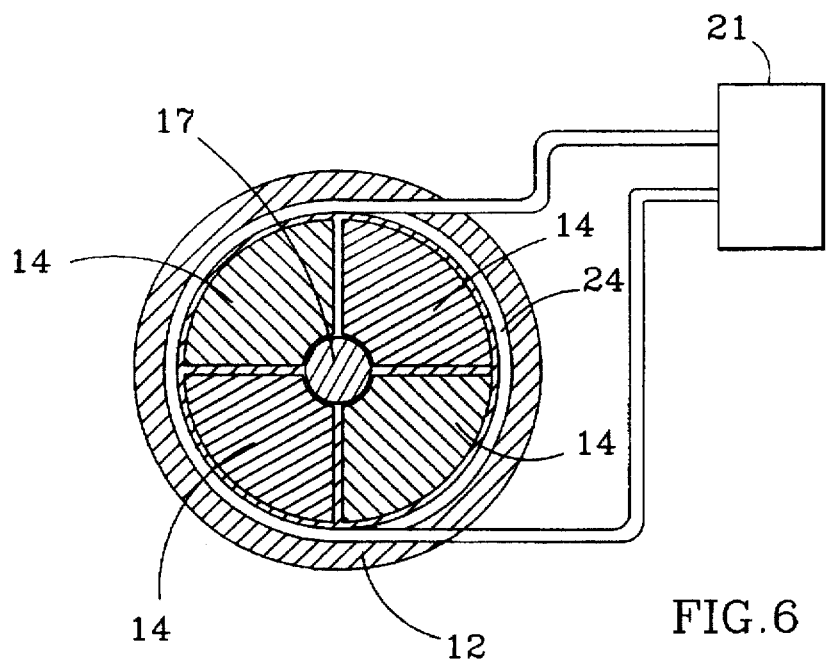
FIG. 6 is a top plan view of the embodiment shown in FIG. 5.

Another possible retainer configuration is that of a wire 24 formed in a helix, as shown in FIGS. 5 and 6. The helix 24 would be made from a SMA material and would have constricted and expanded states. This type of retainer 24 is likely to have a greater separation margin and be easier to manufacture than the cylindrical retainer 16 discussed above. However, the load capability with a retainer 24 of this type may be less than that of a cylindrical retainer.

With a helical retainer 24, the SMA wire can be used as its own heater, thus eliminating the need to affix a separate heater element to the surface of the retainer. A remote actuation device 21 supplying electrical current, as discussed above, would be connected to the helical wire 24 to cause it to heat to its restoration temperature. With this type of design, the mechanical and electrical integrity of the wire 24 can be verified by measuring its electrical resistance.

A retainer formed from a SMA material that exhibits a "two way" effect may also be employed. A retainer of this type achieves its expanded state when heated above its restoration temperature, and returns to its constricted state when its temperature drops below the restoration temperature. Tinel, available from Raychem, Corp., exhibits this effect, though the effect is not utilized in the preferred embodiment.

Figure 7:
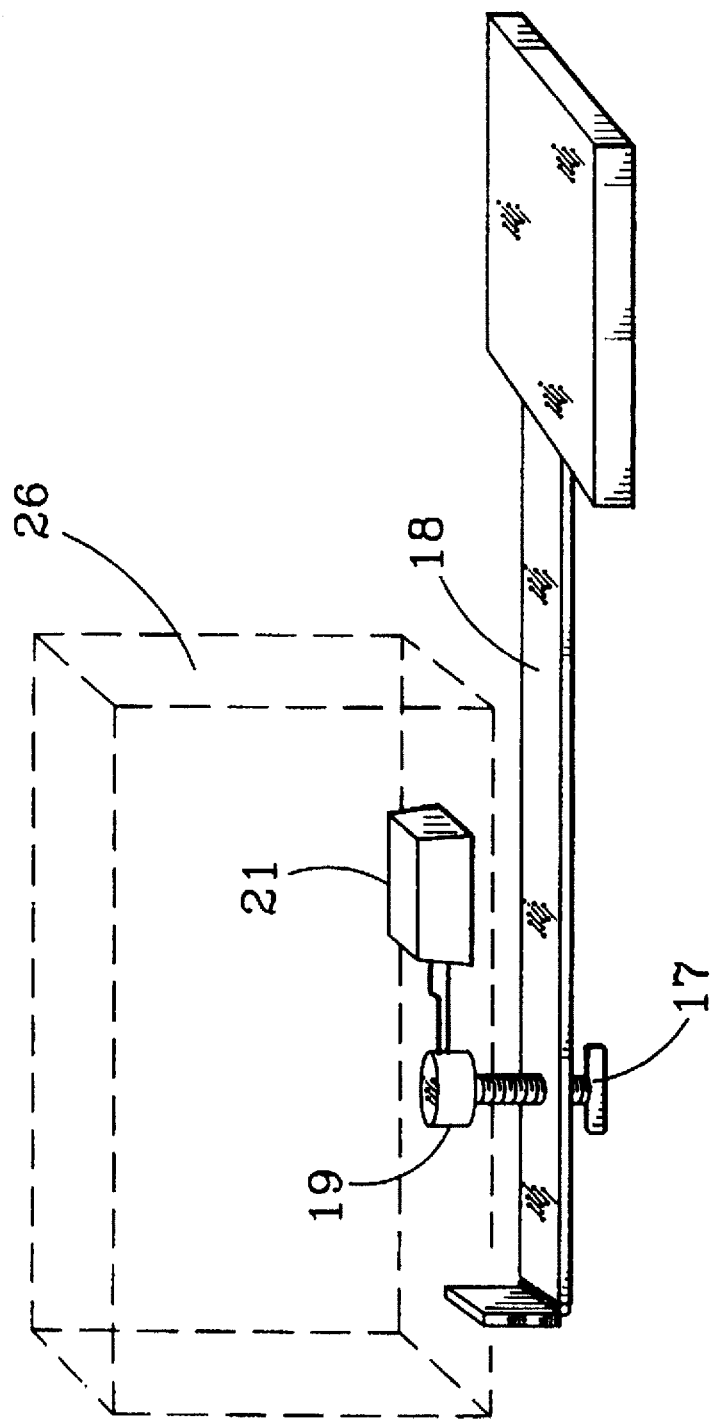
FIG. 7 is a perspective view of a typical application of the invention.

A typical application of the separation device of FIG. 1 is shown in FIG. 7. An object to be secured 18 is a solar panel secured to the side of a satellite 26. The bolt 17 passes through the arm of the solar panel 18 and engages the threaded segments 14 (not shown) of a separation device contained within housing 19. When the panel is to be deployed, remote activation device 21 is commanded to supply current to heater 18 (not shown), which causes retainer 16 (not shown) to expand and release the bolt.

While particular embodiments of the invention have been shown and described, numerous variations and alternate embodiments will occur to those skilled in the art. Accordingly, it is intended that the invention be limited only in terms of the appended claims.

We claim:

1. An apparatus for releasably securing a workpiece, comprising:
   a segmented securing device having a plurality of segments mounted in a movable relationship such that when moved together said segments secure a workpiece and when moved apart said segments release the workpiece, and
   a retainer having constricted and expanded states, said retainer in its constricted state capturing said segments to secure the workpiece, and in its expanded state allowing said segments to move apart to release the workpiece, said retainer returning to its expanded state from its constricted state when heated to a restoration temperature.

2. The apparatus of claim 1, wherein said retainer is formed from nickel-titanium alloy.

3. The apparatus of claim 1, wherein said segmented securing device comprises a segmented nut having a threaded opening for engaging with a threaded workpiece.

4. The apparatus of claim 3, wherein said segmented nut comprises at least two arc-shaped segments, said segments forming a circular threaded opening when captured by said retainer in said constricted state.

5. The apparatus of claim 1, further comprising a base having an upper surface supporting said segments and tapering away from said segments to urge said segments outward as said retainer expands, said base having an opening for inserting a workpiece into said securing device.

6. The apparatus of claim 5, wherein said upper base surface has about a 20 degree taper angle to radial, said base being formed from a stiffly deformable material that develops a preload force against an object that is tightly pressed against the base by a workpiece being tightly secured by said securing device, said preload force urging said segments to ride down the base's upper surface to facilitate release of the workpiece as said retainer expands.

7. The apparatus of claim 1, further comprising a heater positioned to heat said retainer to said restoration temperature.

8. The apparatus of claim 7, wherein said heater comprises an electrical resistance-type heater mounted in thermal transfer contact with said retainer.

9. The apparatus of claim 7, further comprising a remote actuator that includes a switchable source of electric current to actuate said heater.

10. The apparatus of claim 1, wherein said retainer comprises a hollow cylinder surrounding said segmented securing device.

11. The apparatus of claim 1, wherein said retainer comprises a coiled band surrounding said segmented securing device.

12. The apparatus of claim 1, wherein said retainer comprises a wire formed into a helix surrounding said segmented securing device.

13. The apparatus of claim 12, wherein said wire is capable of conducting a current sufficient to heat it to said restoration temperature.

14. The apparatus of claim 13, further comprising a remote actuator that includes a switchable source of electric current for supplying current to said wire sufficient to heat the wire to said restoration temperature.

15. The apparatus of claim 1, wherein said retainer reverts to said constricted state when its temperature falls below said restoration temperature.

16. The apparatus of claim 15, wherein said retainer comprises nickel-titanium alloy.

17. An apparatus for releasably securing a workpiece comprising:
   a segmented securing device having a plurality of segments mounted in a movable relationship such that when moved together said segments secure a workpiece and when moved apart said segments release the workpiece, said segmented securing device comprising a segmented nut having a threaded opening for engaging with a threaded workpiece,
   a retainer having constricted and expanded states, said retainer in its constricted state capturing said segments to secure the workpiece, and in its expanded state allowing said segments to move apart to release the workpiece, said retainer returning to its expanded state from its constricted state when heated to a restoration temperature, said retainer comprising a hollow cylinder surrounding said securing device,
   a base having an upper surface supporting said segments and tapering away from said segments to urge said segments outward as said retainer expands, said base having an opening for inserting a workpiece into said securing device, and
   an electrical resistance-type heater mounted in thermal transfer contact with said retainer to heat said retainer to said restoration temperature.

18. The apparatus of claim 17, wherein said retainer comprises nickel-titanium alloy.

19. The apparatus of claim 17 wherein said segmented nut comprises at least two arc-shaped segments, said segments forming a circular threaded opening when captured by said retainer in said constricted state.

20. The apparatus of claim 17, wherein said upper base surface has about a 20 degree taper angle to radial and said threaded opening has a thread angle of about 30 degrees to radial, said base being formed from a stiffly deformable material that develops a preload force against an object that is tightly pressed against the base by a threaded workpiece being tightly threaded into said securing device, said preload force urging said segments to ride down the base's upper surface to facilitate release of the workpiece as said retainer expands.

21. The apparatus of claim 17, further comprising a remote actuator that actuates said heater.

22. The apparatus of claim 17, wherein said retainer reverts to said constricted state when its temperature falls below said restoration temperature.

23. The apparatus of claim 22, wherein said retainer comprises nickel-titanium alloy.

* * * * *